United States Patent
Benedí Santamaria et al.

(10) Patent No.: US 12,268,221 B2
(45) Date of Patent: Apr. 8, 2025

(54) FATTY PREPARATION, A PROCESS FOR MAKING SAID FATTY PREPARATION, AND A PRODUCT CONTAINING THE SAME

(71) Applicant: BORGES AGRICULTURAL & INDUSTRIAL EDIBLE OILS S.A.U., Tarrega (ES)

(72) Inventors: Carolina Cristina Benedí Santamaria, Tarrega (ES); Maria de la O Martín Martín, Madrid (ES); José Vicente García Berrocal, Madrid (ES); Pedro Antonio Estelles Blay, Madrid (ES)

(73) Assignee: BORGES AGRICULTURAL & INDUSTRIAL EDIBLE OILS S.A.U., Tarrega (ES)

( * ) Notice: Subject to any disclaimer, the term of this patent is extended or adjusted under 35 U.S.C. 154(b) by 484 days.

(21) Appl. No.: 17/046,426

(22) PCT Filed: Apr. 8, 2019

(86) PCT No.: PCT/EP2019/058847
§ 371 (c)(1),
(2) Date: Oct. 9, 2020

(87) PCT Pub. No.: WO2019/197354
PCT Pub. Date: Oct. 17, 2019

(65) Prior Publication Data
US 2021/0112822 A1    Apr. 22, 2021

(30) Foreign Application Priority Data

Apr. 9, 2018 (EP) ..................................... 18382245

(51) Int. Cl.
| | | |
|---|---|---|
| *A23D 9/013* | (2006.01) |
| *A21D 13/068* | (2017.01) |
| *A23D 7/01* | (2006.01) |
| *A23L 29/00* | (2016.01) |
| *A23L 29/10* | (2016.01) |

(52) U.S. Cl.
CPC ............ *A23D 9/013* (2013.01); *A21D 13/068* (2013.01); *A23D 7/011* (2013.01); *A23L 29/04* (2016.08); *A23L 29/10* (2016.08)

(58) Field of Classification Search
CPC ........ A23D 9/013; A23D 29/04; A23D 7/011; A23L 29/10; A21D 13/068
See application file for complete search history.

(56) References Cited

U.S. PATENT DOCUMENTS

| | | | | |
|---|---|---|---|---|
| 4,976,984 A | * | 12/1990 | Yasukawa ................. | A23J 7/00 426/33 |
| 6,117,476 A | | 9/2000 | Eger et al. | |
| 2013/0196045 A1 | * | 8/2013 | Garcia Segovia ..... | A23D 7/013 426/604 |
| 2017/0240935 A1 | | 8/2017 | Huang et al. | |
| 2017/0258106 A1 | | 9/2017 | Rabault et al. | |

FOREIGN PATENT DOCUMENTS

| | | | | |
|---|---|---|---|---|
| BE | 1022049 B1 | * | 2/2016 | |
| EP | 2983486 A1 | * | 2/2016 | ........... A23D 7/0056 |
| EP | 2983486 B1 | * | 4/2017 | ........... A23D 7/0056 |
| IT | FI20120186 A1 | * | 3/2014 | ............... A23D 9/04 |

OTHER PUBLICATIONS

Search Report in International Application No. PCT/EP2019/058847 dated Jul. 1, 2019, 2 pages.

* cited by examiner

*Primary Examiner* — Michele L Jacobson
*Assistant Examiner* — Assaf Zilbering
(74) *Attorney, Agent, or Firm* — Marshall, Gerstein & Borun LLP

(57) ABSTRACT

The present invention relates to a process for making a fatty preparation to be incorporated in a food product, wherein said fatty preparation does not comprise fats with a saturated fat content higher than 40% by weight nor trans fats, nor totally or partially hydrogenated oils or fats, nor interesterified fats. The present invention further relates to a fatty preparation and to a food product comprising the same.

17 Claims, No Drawings

FATTY PREPARATION, A PROCESS FOR MAKING SAID FATTY PREPARATION, AND A PRODUCT CONTAINING THE SAME

FIELD OF THE INVENTION

The present invention relates to field of foodstuff. In particular, the present invention relates to a fatty preparation which does not comprise fats with a saturated fat content higher than 40% by weight, nor trans fats, nor totally or partially hydrogenated oils or fats, nor interesterified fats, i.e. all harmful fatty acids for health, a process for making such fatty preparation and a product containing the same.

BACKGROUND

The discussion about the use of palm oil in the processed food industry has marked the entire sector in recent years. However, while the social and media pressure grows against a foodstuff whose nutritional properties and its productive process are questioned, the sector is betting more than ever on this ingredient.

The first data of 2017 show that the trend continues to rise. According to the trade register, palm oil has been imported by a value of 216 million between January and February, almost twice as much as in the same months of the previous year.

However, the sector intends to calm the discussion about this product. Sources of the Spanish processed food industry assure that the properties of this ingredient "allow to enjoy a wide range of safe products for human consumption". In particular, it is highlighted that it allows to extend the useful life of food.

There are many voices which have criticized the use of this food. On the one hand, NGOs and environmental organizations have criticized the environmental impact of their production. But the criticism of palm oil is made, above all, from the point of view of health. In 2016, the European Food Safety Agency (EFSA) conducted an assessment of three potential food contaminants: glycidyl fatty acid esters (GE), 3-monochloropropanediol (3-MCPD), and 2-monochloropropanediol (2-MCPD). These substances are present in many different oils and fats, although, the highest levels of GE, 3-MCPD, and 2-MCPD are found in palm oil and palm fats. They are formed during food processing, particularly when refining oils at high temperatures (about 200° C.). For consumers aged three and above, margarines and pastries and cakes' were the main sources of exposure to all substances.

By way of example, the bakery sector can be mentioned. Salt, added sugar and saturated and hydrogenated fats are three unhealthy elements that are often present in ultra processed products, such as industrial bakery. Regarding fats, among which oil is included, most of them which are used in these products are of low nutritional quality. One of the reasons is the price. Employing cheap ingredients also reduces the final cost for the final consumer.

Palm oil is an ingredient that fits very well with this description, it has a texture that allows it to be used as a substitute for butters and margarines and as a replacement ingredient for hydrogenated and trans fats. These characteristics make it the ideal candidate to be part of many products that the population usually consume, but it is very rich in saturated fats. Its nutritional profile is, therefore, different from that of sunflower oil or olive oil. Several scientific studies suggest that a diet rich in saturated fats can increase cardiovascular risk, in addition to increasing the levels of "bad" cholesterol and insulin resistance, a risk factor for type 2 diabetes. To these harmful effects the weight gain is also added.

Nowadays it is well known the recommendation of avoiding foods that contain palm oil, coconut oil, or hydrogenated or partially hydrogenated fats, since these last nomenclatures indicate that this is a product with trans fatty acids.

However, this kind of products are very attractive, and not only for the price. Its composition makes them very palatable, something that influences in food preferences. Some researches state that the most preferred products have a common trait: a flavor that is enhanced with three ingredients (salt, sugar and fat) that, in excess, are dangerous for health.

However, it is not the only fat that we can use to make sweet products. We find a large number of lipids that are worth knowing. The main fats that can be used in food products are:

Edible animal fats: Butter, lard, ghee, . . .
Fats of non-animal origin
Transformed or mixed fats: Margarines
Edible vegetable fats: Oils, cocoa butter, coconut oil or butter, palm butter, shortenings.

Accordingly, the present inventors provide a new fatty preparation which is an alternative to the use of palm in the food industry which is simply composed of a vegetable oil and an emulsifying agent (for example, E-471, E-472, E-475). Depending on the final product in which the fatty preparation is to be incorporated the fatty preparation may further include antioxidants, flavouring agents, food colorings, etc. The way in which this fatty preparation is obtained is also advantageous over prior art since it is carried out in a discontinuous way.

Currently, the employed way to make a food product with a similar fatty preparation as disclosed herein is a continuous process which must consist of at least 3 reactors or heated mixers, the first for melting the emulsifying agent with the oil at high temperatures (more than 80° C.), the next reactor serves for adding other ingredients and to low the temperature to about 50° C. and will also serve as a tank that is fed to the third reaction tank, which is the one used to generate emulsions like the mass of the food product that is desired to be made.

The working temperatures of the food products are usually 35-55° C. For this reason the second reaction tank is necessary in which the mixture will be cooled and other ingredients necessary in the final product will be added.

The palm fat used by the bakery industry and food industry in general normally operates at temperature ranging between 40° C. and 60° C. depending on the type of palm fraction being treated. This industry does not require a reactor and/or tanks with temperatures higher than 60° C., so that for an alternative to the palm as the fatty preparation provided by this invention, the working procedure currently used is not useful.

For this reason, an alternative way is proposed to be able to obtain the alternative product to the palm and it is executed discontinuously for food products without the need of 2 further reaction tanks. It will only be necessary a single reaction tank in which the mixture will be prepared, it will be melt at high temperature, the rest of the ingredients will be added and later it will be cooled or not to about 60-70° C. to be packed in buckets or bag-type plastic material.

In other words, a way of obtaining an alternative product to the palm is described, which does not require two reactors or tanks for continuous mixing or the need for cooling.

With this new procedure the operation at high temperatures can be reduced to a third or fourth part (since it does not require passing the mixture to a second reaction tank), the product will be more stable and will look less oxidized than the one offered by the alternative process in continuous with the reactors and even working with the palm that involves maintaining the qualified product at about 50-60° C. all the time from the palm supplier's exit, during the entire logistic journey until it is used in the manufacture of the food product.

SUMMARY OF THE INVENTION

In a first aspect, the present invention relates to a process for making a fatty preparation to be incorporated in a food product, wherein said fatty preparation does not comprise fats with a saturated fat content higher than 40% by weight nor trans fats.

In a second aspect, the present invention relates to a fatty preparation as defined further below.

In a third aspect, the present invention relates to a food product comprising the fatty preparation according to the second aspect.

In a fourth aspect, the present invention relates to the use of a fatty preparation according to the second aspect, as a substitute component for fat or animal-derived ingredients to be incorporated in a food product.

DETAILED DESCRIPTION OF THE INVENTION

In a first aspect, the present invention relates to a process for making a fatty preparation to be incorporated in a food product, in particular as a substitute component for fat or animal-derived ingredients, wherein said fatty preparation does not comprise fats with a saturated fat content higher than 40% by weight, nor trans fats, nor totally or partially hydrogenated oils or fats, nor interesterified fats, comprising the steps of:
  a) heating an oil in an amount between 50 and 99% by weight with respect to the total preparation selected from the group consisting of high oleic sunflower oil, olive oil, extra virgin olive oil, sunflower seed oil, rapeseed oil, grapeseed oil and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in a reactor up to 90° C.;
  b) adding a fatty acid mono- and diglycerides-type emulsifier in an amount between 1 and 50% by weight with respect to the total preparation selected from E-471, E-472, E-475 or a mixture thereof to the oil of step a) until obtaining a complete dissolution;
  c) cooling the mixture to 60-70° C., optionally with a metallic cloth (mesh 400-800 mGh);
  d) packing the hot product; optionally in bucket containers or with plastic bags;
  providing that the amount of the components added in steps a) and b) does not exceed 100%.

The materials used in step d) must be prepared for hot packaging and have a good protection against oxidation. The bucket-type containers will be or not covered with a plastic bag and will be sealed tightly or sealed. Plastic bag-type containers will be "bag in box" type or plastic bags that will be heat-sealed by heat or by induction. The final fatty preparation product solidifies as it is cooled in the bucket or plastic bag so that later it can be handled without problems to the tank for preparing the final food product.

In the context of the present invention the term "a saturated fat" is understood as fatty acids which do not have double bonds in their chain. Examples thereof include, but not limited thereto, palm or coconut oil.

The term "trans fats" is understood as unsaturated fats that are formed in the industrial processing of some foods known as hydrogenation, during which their configuration is changed. Examples thereof include, but not limited thereto, partially hydrogenated fats.

The term "totally or partially hydrogenated oils or fats" is understood as unsaturated fats that undergo a chemical process (hydrogenation) in order to incorporate hydrogen into their structure and thus solidify them. The process can be applied completely making them completely saturated or partial saturated (only a part of the fat is used). Partial hydrogenation can lead to trans fats.

The term "interesterified fats" is understood as fats that have undergone a chemical process by catalysts or enzymes, rearranging their fatty acids to convert them into solid fats.

The term "food product" is understood as food products which are basically made with fermented or non-fermented, stuffed or non-stuffed flour dough, whose main ingredients are flours, oils or fats, water, with or without yeast, to which other foods, bread additives or authorized additives can be added and which have been subjected to a suitable thermal treatment. Examples thereof include, but not limited thereto, biscuits, "ensaimadas", cream filling for biscuits, cakes, cookies, crackers, chocolate creams, dehydrated soups, stock cubes, food preparations for fast food, laminated doughs for use in pizza, in "empanadas", in short pastry, in quiche.

E-471 is also defined as fatty acid mono- and diglycerides.
E-472 is also defined as fatty acid mono- and diglycerides esters.
E-475 is also defined as fatty acid polyglycerides esters.

In a preferred embodiment, the oil is in an amount between 70 and 99% by weight with respect to the total preparation.

In another preferred embodiment, the fatty acid mono- and diglycerides-type emulsifier is added in an amount between 1 and 30% by weight with respect to the total preparation.

In another preferred embodiment, the step b) further comprises the addition with the emulsifier or once the emulsifier has been melted with the oil of at least one of the following ingredients: antioxidant (for example, E-306 (tocopherol concentrate) or E-304 (Ascorbyl palmitate), soy lecithin, food colorings (for example, liposolubles and non-liposolubles food colorings), flavouring agent (for example, liposolubles flavouring agents), guar gum, locus bean gum, gum Arabic, meal, starch (rice, corn, potato), modified starch, salt, sunflower lecithin, sunflower waxes, rice waxes, water, xanthan gum, antioxidant, colorant, preservative, maltodextrin, glucose, sweetener, alginate, anhydrous citric acid or lactic acid or acetic acid or a mixture thereof, pectin, and cellulose. A person of ordinary skill in the art can choose one or another or a combination thereof depending on the final purpose. The present invention specifically encompass the individual addition of said other ingredients or of any group (at least two ingredients) of said ingredients in the fatty preparation. Obviously, when further ingredients are added in step b) the amount of oil and fatty acid mono- and diglycerides-type emulsifier cannot be the extreme values in the ranges, i.e., for example, if oil is in amount of 99% by weight, the fatty acid mono- and diglycerides-type emulsifier cannot be 1% or if oil is in amount of 70% by weight, the fatty acid mono- and diglycerides-type emulsifier cannot be 30%, providing that the total amount of components in the preparation is 100%.

In a particular preferred embodiment, said further ingredient is an antioxidant, for example selected from E-306 (tocopherol concentrate), E-304 (Ascorbyl palmitate) and a combination thereof.

In another particular preferred embodiment, said further ingredient is soy lecithin.

In another particular preferred embodiment, said further ingredient is a food coloring, for example a liposoluble food coloring.

In another particular preferred embodiment, said further ingredient is a flavouring agent, for example a liposoluble flavouring agent.

In another preferred embodiment, the fatty preparation made by the process disclosed in the first aspect of the invention and all the embodiments included therein is to be incorporated in a food product selected from biscuits, "ensaimadas", cream filling for biscuits, cakes, cookies, crackers, chocolate creams, dehydrated soups, stock cubes, food preparations for fast food, laminated doughs for use in pizza, in "empanadas", in short pastry, in quiche.

Accordingly, the present inventors provide a new process for preparing a fatty preparation which is an alternative to the use of palm in the bakery industry and food industry in general which is simply composed of a vegetable oil and an emulsifying agent (for example, E-471, E-472, E-475). Depending on the final product in which the fatty preparation is to be incorporated the fatty preparation may further include antioxidants, flavouring agents, food colorings, etc. The way in which this fatty preparation is obtained is advantageous over prior art as it has been previously disclosed.

It is noted that any of the previous embodiments related to the process can be combined each other.

In second aspect, the present invention relates to a fatty preparation comprising or consisting of the following components:
  a) an oil in an amount between 50 and 99% by weight with respect to the total preparation selected from the group consisting of oleic high sunflower oil, olive oil, extra virgin olive oil, sunflower seed oil, rapeseed oil, grapeseed oil and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil;
  b) a fatty acid mono- and diglycerides-type emulsifier selected from E-471, E-472, E-475 or a mixture thereof in an amount between 1 and 50% by weight with respect to the total preparation;
  wherein said fatty preparation does not comprise fats with a saturated fat content higher than 40% by weight, nortrans fats, nor totally or partially hydrogenated oils or fats, nor interesterified fats,
  providing that the amount of all the components in the final preparation does not exceed 100%.

In a preferred embodiment, the oil is in an amount between 70 and 99% by weight with respect to the total preparation.

In another preferred embodiment, the fatty acid mono- and diglycerides-type emulsifier in an amount between 1 and 30% by weight with respect to the total preparation.

In another preferred embodiment, said fatty preparation further comprises at least one of the further ingredients: antioxidant (for example, E-306 (tocopherol concentrate) or E-304 (Ascorbyl palmitate), soy lecithin, food colorings (for example, liposolubles and non-liposolubles food colorings), flavouring agent (for example, liposolubles flavouring agents), guar gum, locus bean gum, gum Arabic, meal, starch (rice, corn, potato), modified starch, salt, sunflower lecithin, sunflower waxes, rice waxes, water, xanthan gum, antioxidant, colorant, preservative, maltodextrin, glucose, sweetener, alginate, anhydrous citric acid or lactic acid or acetic acid or a mixture thereof, pectin, and cellulose. A person of ordinary skill in the art can choose one or another or a combination thereof depending on the final purpose. The present invention specifically encompass the individual addition of said other ingredients or of any group (at least two ingredients) of said ingredients in the fatty preparation. Obviously, when further ingredients are added in step b) the amount of oil and fatty acid mono- and diglycerides-type emulsifier cannot be the extreme values in the ranges, i.e., for example, if oil is in amount of 99% by weight, the fatty acid mono- and diglycerides-type emulsifier cannot be 1% or if oil is in amount of 70% by weight, the fatty acid mono- and diglycerides-type emulsifier cannot be 30%, providing that the total amount of components in the preparation is 100%.

In a particular preferred embodiment, said further ingredient is an antioxidant, for example selected from E-306 (tocopherol concentrate), E-304 (Ascorbyl palmitate) and a combination thereof.

In another particular preferred embodiment, said further ingredient is soy lecithin.

In another particular preferred embodiment, said further ingredient is a food coloring, for example a liposoluble food coloring.

In another particular preferred embodiment, said further ingredient is a flavouring agent, for example a liposoluble flavouring agent.

In a preferred embodiment, the fatty preparation comprises or consists of the following components independently present in the final composition in the following ranges (% w/w):
  a) an oil in an amount between 60 and 85% by weight with respect to the total preparation selected from the group consisting of oleic high sunflower oil, olive oil, extra virgin olive oil, sunflower seed oil, rapeseed oil, grapeseed oil and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil;
  b) a fatty acid mono- and diglycerides-type emulsifier in an amount between 5 and 35% by weight with respect to the total preparation selected from E-471, E-472, E-475 or a mixture thereof;
  c) water in an amount between 1 and 25% by weight with respect to the total preparation;
  d) xantham gum in an amount between 0.1 and 5% by weight with respect to the total preparation;
  e) cellulose in an amount between 0.1 and 5% by weight with respect to the total preparation;
  f) modified starch in an amount between 0.1 and 5% by weight with respect to the total preparation;
  wherein said fatty preparation does not comprise fats with a saturated fat content higher than 40% by weight, nor trans fats, nor totally or partially hydrogenated oils or fats, nor interesterified fats, providing that the amount of all the components in the final preparation does not exceed 100%.

The present invention also relates to process, according to the above mentioned embodiments, for preparing a fatty preparation comprising or consisting of the following components independently present in the final composition in the following ranges (% w/w):

a) an oil in an amount between 60 and 85% by weight with respect to the total preparation selected from the group consisting of oleic high sunflower oil, olive oil, extra virgin olive oil, sunflower seed oil, rapeseed oil, grapeseed oil and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil;

b) a fatty acid mono- and diglycerides-type emulsifier in an amount between 5 and 35% by weight with respect to the total preparation selected from E-471, E-472, E-475 or a mixture thereof;

c) water in an amount between 1 and 25% by weight with respect to the total preparation;

d) xantham gum in an amount between 0.1 and 5% by weight with respect to the total preparation;

e) cellulose in an amount between 0.1 and 5% by weight with respect to the total preparation;

f) modified starch in an amount between 0.1 and 5% by weight with respect to the total preparation;

wherein said fatty preparation does not comprise fats with a saturated fat content higher than 40% by weight, nor trans fats, nor totally or partially hydrogenated oils or fats, nor interesterified fats, providing that the amount of all the components in the final preparation does not exceed 100%, wherein previous to step a) water is heated at 85-95° C. and solid ingredients xantham gum, cellulose and modified starch are added to the hot water and then the mixture of water and solid ingredients is added on step c) to the oil along with fatty acid mono- and diglycerides-type emulsifier.

It is noted that any of the previous embodiments or any element of each embodiment related to the solid fatty preparation can be combined each other, i.e., as an example, component a) of one embodiment can be combined with component b) of another embodiment.

In a third aspect, the present invention relates to a food product comprising the fatty preparation according to the second aspect of the invention and all the embodiments included therein. In a preferred embodiment, said food product is a biscuit, "ensaimada", cream filling for biscuits, cakes, cookies, crackers, chocolate creams, dehydrated soups, stock cubes, food preparations for fast food, laminated doughs for use in pizza, in"empanadas", in short pastry, and in quiche.

In a fourth aspect, the present invention relates to the use of a fatty preparation according to any of the embodiments disclosed herein, as a substitute component for fat or animal-derived ingredients to be incorporated in a food product, being said product preferably selected from biscuits, "ensaimadas", cream filling for biscuits, cakes, cookies, crackers, chocolate creams, dehydrated soups, stock cubes, food preparations for fast food, laminated doughs for use in pizza, in "empanadas", in short pastry, and in quiche.

The invention will now be further described by way of the following non-limiting examples.

EXAMPLES

Example 1: Manufacture of Biscuits

The ingredients for preparing the dough for biscuits are:
Wheat flour
Sugar
Vegetable oils of the present invention
Glucose and fructose syrup
E-471
Salt
Gasifiers (sodium and ammonium bicarbonate)
Antioxidant E-306

The preparation of the fatty preparation comprising vegetable oils of the present invention, E-471 and antioxidant E-306 is carried out as follows:

For preparing 450 liters of product:
Fill the reactor with 350 liters of oil and heat it up to 90° C.
Once the oil is heated, add between 50 and 90 kg of E-471 depending on the melting point required for the fatty preparation. In the case of biscuits, the amount will be approximately 80 kg of E-471
Add about 300 ppm of antioxidant E-306
Mix for approximately 30 minutes until the E-471 is completely melted, the mixture becomes transparent as well as the oil.
Cool up to 50° C.-70° C.
Pack the hot product in bucket containers or with a plastic bag.

We proceeded then to prepare the biscuit dough product. In a reactor tank the following ingredients (also mentioned above) which have been previously weighed will be mixed:
Wheat flour
Sugar
Glucose and fructose syrup
Salt
Gasifiers
Fatty preparation (including vegetable oils, E-471 and antioxidant) prepared as described above in solid form and in blocks in a bucket or bag format.

The tank will be heated to about 45° C. under stirring or kneading and subsequently the dough will be pumped to be dosed as biscuits.

The temperature normally reaches 45 or 50° C. because at that temperature the mass is fluid and can be pumped and dosed.

Example 2: Manufacture of Cream Filling for Wafer-Type Biscuit

The ingredients for preparing cream fillings for a wafer-type biscuit are as follows:
Vegetable oils of the present invention
Whey powder
Powdered cream
Powdered milk
E-471
Emulsifier (soy lecithin)
Acidulant (tartaric acid)
Antioxidants E-304, E-306
Food colorings The preparation of the fatty preparation comprising vegetable oils of the present invention, E-471, soy lecithin, antioxidants E-304 and E-306 and liposoluble food colorings is carried out as follows:

For preparations of 450 liters of product:
Fill the reactor with 350 liters of oil and heat it up to 85° C.
Once the oil is heated, add between 50 and 90 kg of E-471 depending on the melting point required for the fatty preparation. In the case of cream fillings, the amount will be approximately between 60 and 85 kg of E-471
Add soy lecithin
Add about 300 ppm of antioxidants E-306 and E-304
Add liposoluble food colorings
Mix for approximately 30 minutes until the E-471 is completely melted, the mixture becomes transparent as well as the oil.
Cool up to 60° C.-70° C.
Pack the hot product in bucket containers or with a plastic bag.
We proceeded then to prepare the cream filling product. In a reactor tank the following ingredients (also mentioned above) which have been previously weighed will be mixed:
Fatty preparation (including vegetable oils, E-471, soy lecithin, liposoluble food colorings and antioxidants E-304 and E-306) prepared as described above in solid form and in blocks in a bucket or bag format.
Whey powder
Powdered cream
Powedered milk
Acidulant (tartaric acid)

The tank will be heated to about 45° C. under stirring or kneading and subsequently the dough will be pumped to be dosed as fillings.

The temperature normally reaches 45 or 50° C. because at that temperature the mass is fluid and can be pumped and dosed.

As shown all the liposoluble ingredients can be integrated into the fatty preparation formula which would lead to a better dispersion of the ingredients and a reduction in the agitation of the cream filling since they have already been previously mixed and processing times would be reduced.

Example 3: Manufacture of "Ensaimadas"

The ingredients for preparing a dough for an "ensaimada" are as follows:
Wheat flour
Sugar
Vegetable oils of the present invention
Glucose and fructose syrup
Egg white
Yeast
Egg
Salt
Emulsifiers: E-471 and E-472
Whey powder
liposoluble flavouring agent
Wheat gluten
Flour treatment agent: ascorbic acid.

The preparation of the fatty preparation comprising vegetable oils of the present invention, E-471, E-472, and liposoluble flavouring agents is carried out as follows:
For preparations of 450 liters of product:
Fill the reactor with 350 liters of oil and heat it up to 85° C.
Once the oil is heated, add between 30 and 70 kg of E-471 and E-472 depending on the melting point required for the fatty preparation.
Add a liposoluble flavouring agent
Mix for approximately 30 minutes until the E-471 and E-472 are completely melted, the mixture becomes transparent as well as the oil.
Cool up to 60° C.-70° C.
Pack the hot product in bucket containers or with a plastic bag.

We proceeded then to prepare the "ensaimada" product. In a reactor tank the following ingredients (also mentioned above) which have been previously weighed will be mixed:
Fatty preparation (including vegetable oils, E-471, E-472 and liposoluble flavouring agent) prepared as described above in solid form and in blocks in a bucket or bag format.
Wheat flour
Sugar
Glucose and fructose syrup
Egg white
Yeast
Egg
Salt
Whey powder
liposoluble flavouring agent
Wheat gluten
Flour treatment agent: ascorbic acid.

The tank will be heated to about 45° C. under stirring or kneading and subsequently the dough for an "ensaimada" will be pumped to be dosed.

The temperature normally reaches 45 or 50° C. because at that temperature the mass is fluid and can be pumped and dosed.

As shown all the liposoluble ingredients can be integrated into the fatty preparation formula which would lead to a better dispersion of the ingredients and a reduction in the stirring of the dough for "ensaimada" since they have already been previously mixed and processing times would be reduced.

Example 4: Manufacture of Dough for Pizza

The ingredients for preparing a dough for pizza are as follows:
Wheat flour
Water
Sunflower oil
Vegetable fats of the present invention
E-471
Salt
Ethanol
Yeast The preparation of the fatty preparation comprising vegetable oils of the present invention and E-471 is carried out as follows:
For preparations of 450 liters of product:
Fill the reactor with 350 liters of oil and heat it up to 90° C.
Once the oil is heated, add between 30 and 70 kg of E-471 depending on the melting point required for the fatty preparation.
Mix for approximately 30 minutes until the E-471 is completely melted, the mixture becomes transparent as well as the oil.
Cool up to 60° C.-70° C.
Pack the hot product in bucket containers or with a plastic bag.

We proceeded then to prepare the dough for the pizza. In a reactor tank the following ingredients (also mentioned above) which have been previously weighed will be mixed:
Fatty preparation (including vegetable oils and E-471) prepared as described above in solid form and in blocks in a bucket or bag format.
Water
Salt
Ethanol
Yeast The tank will be heated to about 45° C. under stirring or kneading and subsequently the dough for pizza will be pumped to be dosed.

The temperature normally reaches 45 or 50° C. because at that temperature the mass is fluid and can be pumped and dosed.

Example 5: Manufacture of Dehydrated Broths

The ingredients for a mixture of dehydrated broths are as follows:
Salt
Flavour enhancers (monosodium glutamate)
Vegetable fats of the present invention
E-471
Yeast extract
Maltodextrin as thickening agent
Spices and vegetables
Food colorings
Liposoluble flavouring agent The preparation of the fatty preparation comprising vegetable oils of the present invention, E-471, maltodextrin, food colorings and liposoluble flavouring agents is carried out as follows:
For preparations of 450 liters of product:
Fill the reactor with 350 liters of oil and heat it up to 90° C.
Once the oil is heated, add between 50 and 150 kg of E-471 depending on the melting point required for the fatty preparation.
Mix for approximately 30 minutes until the E-471 is completely melted, the mixture becomes transparent as well as the oil.
Add maltodextrin, liposoluble flavouring agent and food colorings
Cool up to 60° C.-70° C.
Pack the hot product in bucket containers or with a plastic bag.

We proceeded then to prepare a mixture for dehydrated broths. In a reactor tank or emulsifier reactor the following ingredients (also mentioned above) which have been previously weighed will be mixed:
Fatty preparation (including vegetable oils, E-471, maltodextrin, liposoluble flavouring agent and food colorings) prepared as described above in solid form and in blocks in a bucket or bag format.
Salt
Flavour enhancers (monosodium glutamate)
Yeast extract
Maltodextrin
Spices and vegetables The tank will be heated up to about 35-60° C. under stirring to create an emulsion, and then the preparation for dehydrated broths will be pumped on surfaces with pre-shapes for the subsequent dehydration and compression.

The proposed fatty product will provide greater uniformity in the dispersion of the other ingredients by the amphoteric nature of E-471 and also will provide a greater fluidity to the dough than conventional palm or coconut fat.

The proposed fatty product will also present a greater organoleptic neutrality unlike the palm that has a characteristic flavor, which will allow a greater adaptation of the flavouring agents composing the formula.

The invention claimed is:

1. A fatty preparation consisting of the following components:
    a) an oil in an amount between 50% by weight and 99% by weight with respect to the total fatty preparation, said oil being selected from the group consisting of oleic high sunflower oil, olive oil, extra virgin olive oil, sunflower seed oil, rapeseed oil, grapeseed oil, and any other vegetable oil which is liquid at room temperature containing less than 30% by weight of saturated fats; and,
    b) an emulsifier selected from E-471, E-472, E-475, or a mixture thereof in an amount between 5% by weight and 50% by weight with respect to the total preparation;
    c) optionally, one or more of the following ingredients: antioxidant, soy lecithin, liposoluble and non-liposoluble food colorings, flavoring agent, guar gum, locus bean gum, gum Arabic, meal, starch, modified starch, salt, sunflower lecithin, sunflower waxes, rice waxes, xanthan gum, colorant, preservative, maltodextrin, glucose, sweetener, alginate, anhydrous citric acid, anhydrous lactic acid, anhydrous acetic acid, a mixture of said anhydrous acids, pectin, and cellulose;
    wherein said fatty preparation does not comprise fats with a saturated fat content higher than 40% by weight, trans fats, totally or partially hydrogenated oils or fats, or interesterified fats,
    providing that the amount of all components in the fatty preparation does not exceed 100%,
    wherein the fatty preparation is solid at rest at room temperature.

2. The fatty preparation according to claim 1, comprising 70% by weight to 99% by weight with respect to the total preparation of oil and 5% by weight to 30% by weight with respect to the total preparation of the emulsifier.

3. The fatty preparation according to claim 1, wherein said antioxidant is E-306 or E-304 or a mixture thereof.

4. The fatty preparation according to claim 1, comprising 60% by weight to 85% by weight with respect to the total preparation of an oil selected from the group consisting of oleic high sunflower oil, olive oil, extra virgin olive oil, sunflower seed oil, rapeseed oil, grapeseed oil, and any other vegetable oil which is liquid at room temperature containing less than 30% by weight of saturated fats.

5. The fatty preparation according to claim 1, comprising 5% by weight to 35% by weight with respect to the total preparation of the emulsifier.

6. The fatty preparation according to claim 1, comprising at least one of:
    0.1% by weight to 5% by weight with respect to the total preparation of xanthan gum; or
    0.1% by weight to 5% by weight with respect to the total preparation of cellulose; or
    0.1% to 5% by weight with respect to the total preparation of modified starch.

7. The fatty preparation according to claim 1, comprising:
    a) 60% by weight to 85% by weight with respect to the total fatty preparation of said oil;
    b) 5% by weight to 35% by weight with respect to the total fatty preparation of said emulsifier;

c) 0.1% by weight to 5% by weight with respect to the total fatty preparation of xanthan gum;
d) 0.1% by weight to 5% by weight with respect to the total fatty preparation of cellulose; and
e) 0.1% by weight to 5% by weight with respect to the total fatty preparation of modified starch.

8. A food product comprising the fatty preparation of claim 1, which food product is selected from the group consisting of biscuits, "ensaimadas", cakes, cookies, crackers, chocolate creams, dehydrated soups, stock cubes, food preparations for fast food, and laminated doughs for use in pizza, in "empanadas", in short pastry, and in quiche.

9. The food product according to claim 8 wherein the fatty preparation is a substitute component for fat or animal-derived ingredients of said food product.

10. A process for making a fatty preparation according to claim 1, comprising the steps of:
a) heating said oil in a reactor up to 90° C.; and,
b) adding said emulsifier to the oil of step a) until obtaining a complete dissolution;
c) cooling the resulting mixture of step b) to 60° C. to 70° C.;
d) packing the resulting product of step c); and
e) cooling the packed product of step c) sufficiently to solidify the packed product,
providing that the amount of the components added in steps a) and b) does not exceed 100%, and
wherein the fatty preparation is solid at rest at room temperature.

11. The process according to claim 10, wherein the oil is in an amount between 70% by weight and 99% by weight with respect to the total fatty preparation.

12. The process according to claim 10, wherein the emulsifier is added in an amount between 5% by weight and 30% by weight with respect to the total fatty preparation.

13. The process according to claim 10, wherein step b) further comprises adding with the emulsifier or after the emulsifier has been melted with the oil at least one of the following ingredients: antioxidant, soy lecithin, liposoluble and non-liposoluble food colorings, flavoring agent, guar gum, locus bean gum, gum Arabic, meal, starch, rice, corn, potato, modified starch, salt, sunflower lecithin, sunflower waxes, rice waxes, xanthan gum, colorant, preservative, maltodextrin, glucose, sweetener, alginate, anhydrous citric acid, anhydrous lactic acid, anhydrous acetic acid, a mixture of said anhydrous acids, pectin, and cellulose.

14. The process according to claim 13, wherein said antioxidant is E-306 or E-304 or a mixture thereof.

15. The process according to claim 10, comprising packing the product of step c) in bucket containers or within plastic bags in step d).

16. A food product comprising the fatty preparation of claim 7, which food product is selected from the group consisting of biscuits, "ensalmadas", cream filling for biscuits, cakes, cookies, crackers, chocolate creams, dehydrated soups, stock cubes, food preparations for fast food, and laminated doughs for use in pizza, in "empanadas", in short pastry, and in quiche.

17. A fatty preparation prepared by the process of claim 10.

* * * * *